April 5, 1955 W. C. KRUGER 2,705,677
METHOD OF TREATING MEAT
Filed July 26, 1951 3 Sheets-Sheet 1
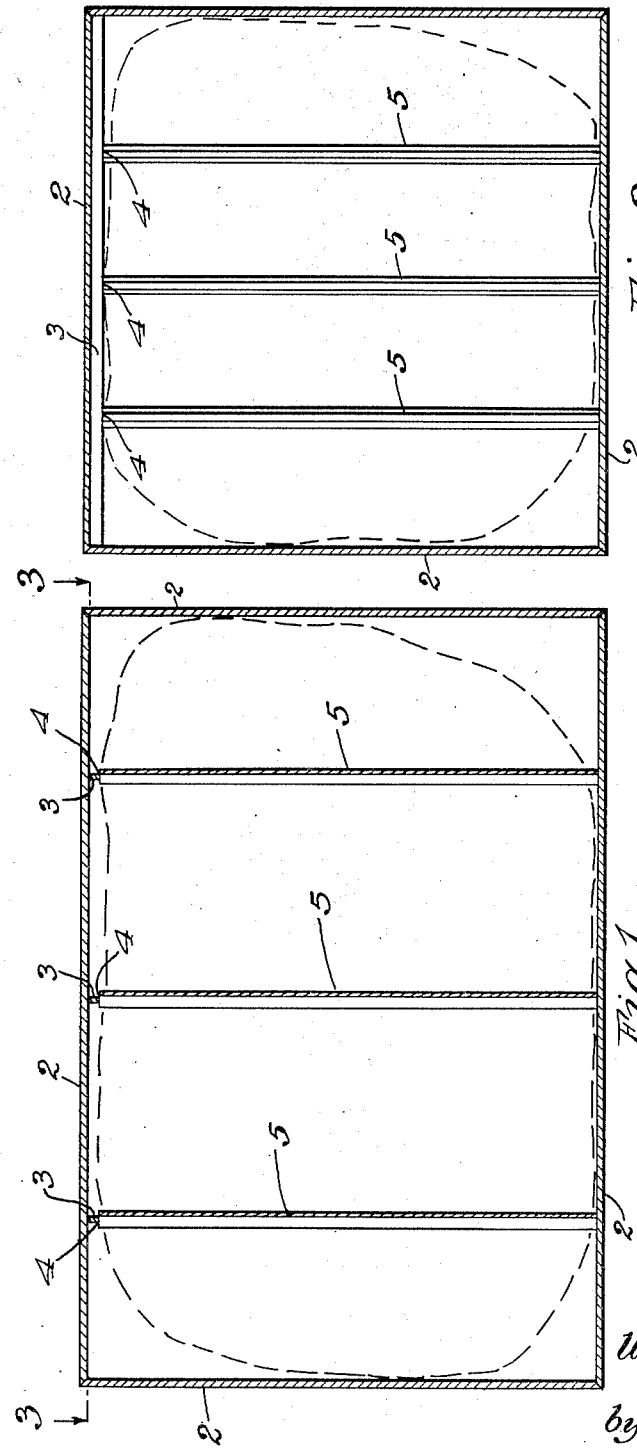
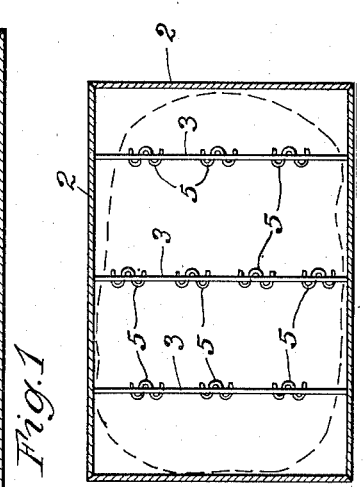
Inventor
William C. Kruger
by Parker & Carter
Attorneys April 5, 1955   W. C. KRUGER   2,705,677
METHOD OF TREATING MEAT
Filed July 26, 1951   3 Sheets-Sheet 2
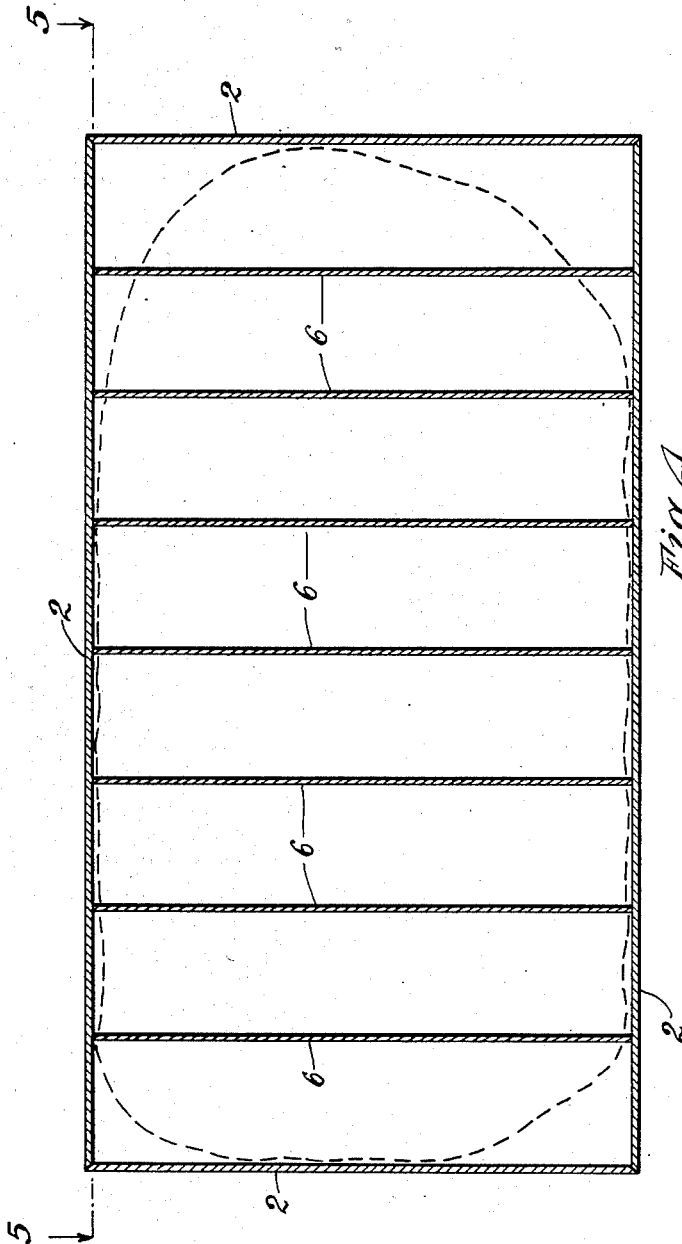
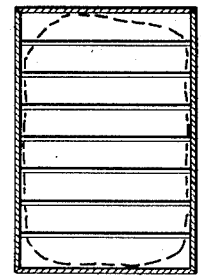
Inventor
William C. Kruger
by Parker + Carter
Attorneys April 5, 1955  W. C. KRUGER  2,705,677
METHOD OF TREATING MEAT
Filed July 26, 1951  3 Sheets-Sheet 3

Inventor
William C. Kruger
by Parker + Carter
Attorneys

United States Patent Office 2,705,677
Patented Apr. 5, 1955

2,705,677

METHOD OF TREATING MEAT

William C. Kruger, Indianapolis, Ind.

Application July 26, 1951, Serial No. 238,681

7 Claims. (Cl. 99—187)

My invention relates to means for and process of preserving, storing and shipping meat, foods and the like. Meat, especially such large cuts as ham, shoulders, etc., which are canned for shipment and storage must be pasteurized to prevent spoilage after the can is filled and closed. Because such materials are good insulators, it takes a very long time to raise the temperature of the entire mass to a point where bacteria are killed and danger of spoilage is removed. Frequently it takes so much time and such high temperature that the outside of the meat is overcooked and the inside undercooked, and so solid meats or solid foods must be kept under refrigeration even though canned to prevent spoilage.

To obviate these difficulties, therefore, I propose to provide means to diffuse heat rapidly through the mass so it will be heated rapidly and uniformly throughout.

One purpose of my invention is to provide an improved process and means for rapidly raising food to high temperatures.

Another purpose of the invention is to provide a means for heating food evenly throughout.

Another purpose of the invention is to provide a means for reducing the length of time necessary to bring food to high temperatures.

Another purpose of the invention is to provide a means for transmitting heat quickly and evenly throughout a mass of food.

Another purpose is to provide a means for packaging food so that it can be quickly heated by the consumer.

Other purposes will appear from time to time throughout the specification and claims.

The invention is illustrated more or less diagrammatically in the accompanying drawings, wherein—

Figure 1 is a vertical sectional view through the length of the container;

Figure 2 is a vertical sectional view through the width of the container;

Figure 3 is a top view taken on the line 3—3 of Figure 1;

Figure 4 is a variant form of Figure 1, using plates instead of prongs;

Figure 5 is a top view of Figure 4 taken on the line 5—5 of Figure 4;

Like parts are indicated by like characters throughout the specification and drawings.

Figure 6:
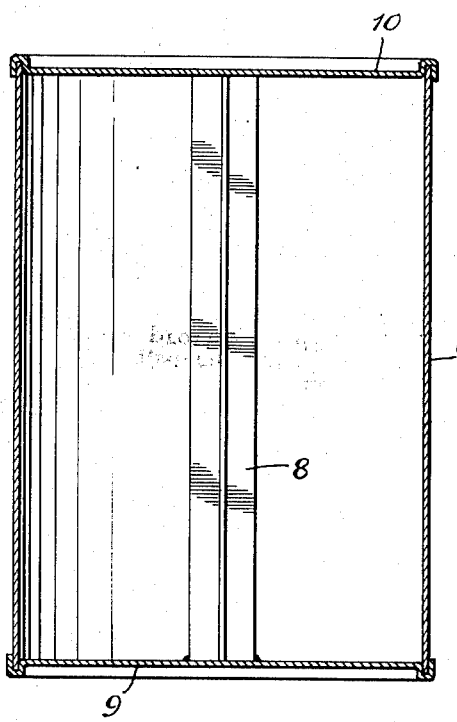
Figure 6 is a section through a preferred form of can taken in a vertical plane.

This is a continuation-in-part of my co-pending application Serial Number 768,805 filed August 15, 1947, now abandoned.

Referring to the drawings, I illustrate a food container 2 made of some high thermal conductive material. In Figures 1, 2 and 3, I show a series of comb-like prongs that extend through the food mass from top to bottom in the container. The comb-like prongs consist of an arm 3 that extends across the width of the container immediately under the top. Attached to the arms at 4 are corrugated rods 5 that penetrate the food at frequent intervals. The arm 3 and the rods 5 are made of a material with high thermal conductivity such, perhaps as aluminum. They are placed at frequent intervals, preferably so that no part of the meat is more than an inch and a half from either a rod 5 or the walls of the container 2.

It is to be understood that various shaped penetrating means may be used, for instance, the rods 5 could be round or flat or corrugated. In Figure 4 and Figure 5, I show a variant form in which I employ plates 6 extending through the food from the top to the bottom. The plates are likewise placed at frequent intervals so as to be in close proximity with all the contents of the container. Under such circumstances, the meat would have to be sliced so as to fit between the plates.

When prongs or forks are used, the meat remains a solid mass, and the size of the penetrating diffusers may be so selected that the meat, when the diffusers are withdrawn, is little if at all changed in appearance or texture.

Figure 7:
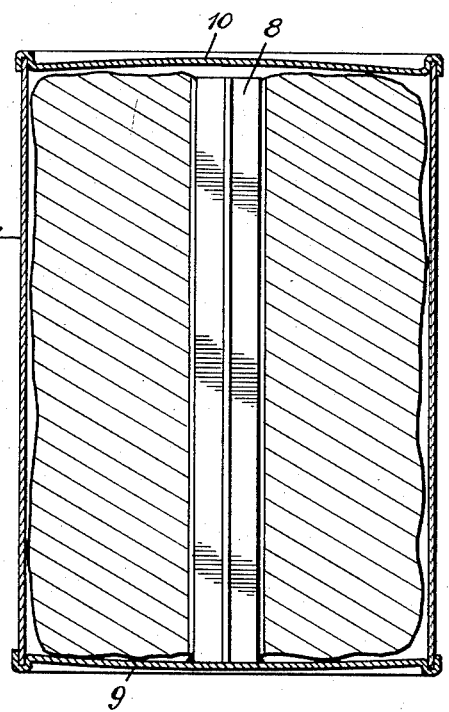
Figure 7 is a transverse section through the can showing a chunk of meat therein.

Figures 6 and 7 show a different shaped skewer. In this case when used with a round can 7 for example, the cross shaped skewer 8 is welded or soldered or otherwise permanently attached by some heat conducting means to the bottom 9 of the can. The can top 10 and bottom are usually attached when the meat is first put into the can by vacuum sealing as is common in the meat industry so that the top of the can is in contact with the skewer. When the can is heated, the contents expand and tend to expand the top and bottom. Under these circumstances, if the skewer is not permanently anchored in heat transfer relationship to one end of the can, it may happen that the skewer will float between the opposed top and bottom of the can and less adequate heat transfer will take place. By permanently attaching the skewer to the top or bottom of the can, this guarantees that one or the other end of the skewer is in direct heat transfer relationship with the surface of the can which receives the impact of the heating means.

The meat is first cured, boned and then precooked, that is—boiled, for a length of time sufficient to remove or extract surplus or excessive moisture. The time required when applied to a chunk of meat to fit a can of the ordinary size, namely—five inches high by three or four inches in diameter, is approximately thirty minutes. Then the meat is cut or shaped to fit the can and a central, thin, flat cut is made longitudinally through the chunk of meat from end to end.

Figure 8:
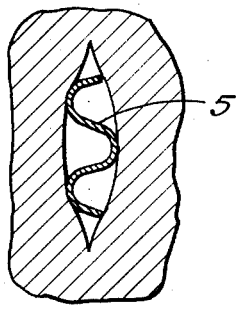
Figure 8 is a detail section showing the relationship between the skewers of Figures 1, 2 and 3 and the meat.
Figure 9:
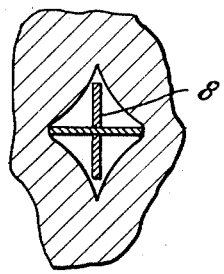
Figure 9 is a similar section showing the relationship between the skewer of Figures 6 and 7 and a chunk of meat.
Figure 10:
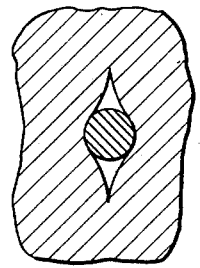
Figure 10 is a similar section to Figures 8 and 9 showing the relation of the meat and a round skewer.

Raw meat or even parboiled or partially cooked meat is likely to be tough and the heat conducting skewer of aluminum or the like can be inserted in the meat only with difficulty unless the meat is sealed or cut with a sharp knife. Figures 8, 9 and 10 show the relationship between the skewer and the cut or slot made in the meat to permit entrance of the skewer without tearing the meat. The skewer is preferably of different shape from the cut. The result of this is that the meat is expanded or stretched slightly around the skewer and a passage is thus provided around the skewer through which the juice may circulate as heating or cooking takes place. This permits the heat transfer and assists in materially shortening the length of time required.

The chunk of meat threaded on the skewer with the skewer expanding the slot in the meat so as to insure a clearance for juices is then sealed under vacuum, thus collapsing the ends of the can slightly and causing both ends of the skewer to engage, one the top and one the bottom of the can. It will be remembered that one end of the skewer is permanently attached to either the top or bottom of the can. Then when the vacuum sealed filled can is subjected to heat, the contents of the can expands, causing ultimately slight clearance between one end of the skewer and one end of the can but leaving the skewer in intimate heat flow relationship with one end of the can. Since the skewer is to be inserted in a pre-cut hole in the meat, the skewer may have a blunt end so that while in contact with the cover it provides a broad channel for heat transfer.

With a can of the type illustrated in Figures 6 and 7, the skewer may be made of aluminum, two pieces interlocking, each one one-sixteenth of an inch thick, one-half inch wide and four and one-half inches long, the piece being slotted so that they can be secured together in a cross-shaped skewer blade. One end of the skewer is fixed to the end of the can with aluminum solder. The can is filled with a solid single piece of ham, trimmed to fit the container or can and weighing approximately twenty-six ounces. The meat is slotted to permit insertion of the skewer. In a test another identical can with the same weight of meat was heated at the same time without any skewer and without any slotting of the ham. Each can was subjected to outside temperature of 235 degrees F. The temperature of the meat in the can was determined and the temperature of the meat was found to be 221 degrees F. in the sample with the skewer at the end of sixty-two minutes, whereas the meat in the sample without the skewer was not completed or adequately processed to prevent contamination until one hundred twenty-five minutes.

The result of this, of course, is that much time is saved but second and equally important, that the tendency for the temperature rise in the meat is more uniform throughout the mass of meat and the result is that the outside of the mass is not overcooked awaiting adequate cooking of the inside of the mass.

The use and operation of my invention are as follows:

In the processing of meat or other food, some meat is packed as a solid mass in a container and then subjected to heat. When the heat is transmitted from the walls of the container only, it takes many hours to penetrate to the innermost portions of the meat. During this process the outer portions are often cooked too much or lose some of their flavor from too long a subjection to heat, and much juice is extracted into the can and wasted and the meat, as a result, becomes dry and tasteless.

By employing penetrating diffusing means with high thermal conductivity at frequent intervals, the applied heat is transmitted and diffused to all parts of the meat at approximately the same time. This greatly reduces the length of time necessary to process the food; it eliminates the danger of overcooking and it prevents spottiness of temperatures in the food mass.

According to my process then, the meat or other material is first prepared for treatment in the usual manner. The shipping container is provided with the tines or diffusers or prongs extending inwardly from the bottom or top or side of the can, as the case may be. The meat is placed in the can; the tines are forced to penetrate throughout the meat; and the can is closed. The can is then heated from the outside in any desired manner. The contents of the can are then heated by radiation from or contact with the inner walls of the can to heat the outer parts, and the tines conduct heat from the walls of the can inwardly throughout the meat or other material in the can until the entire mass is rapidly and evenly carried to the desired temperature. The meat is then shipped and stored in the original container. When the container is opened, the tines or skewers are withdrawn; the meat is removed; and the can and tines thrown away.

My apparatus and method may be applied to raw meat. However, when applied to uncooked ham the natural shrinkage is very great and preferably therefor the process I propose to carry out involves first heating or parboiling the ham to obtain preliminary shrinkage in the order of perhaps from fifteen to twenty percent at temperatures below 242 degrees F. Then the meat having been preshrunk is slotted to permit penetration of the skewer, is canned under vacuum and is then subjected to heating sufficient to sterilize the contents of the can under the conditions above outlined, that is, with the skewer or skewers penetrating the ham along the small slots previously cut to admit the skewer. It will be understood, of course, that when the can is open, ham or other meat is withdrawn, the small slots accommodating the skewers disappear, the meat closes up and while the slots are still in existence, they are to all intents and purposes not visible to the naked eye and do not to any degree affect the utility, taste and character of the meat.

The meat substantially fills the can and there is normally a generally close and intimate contact between the walls of the can and the meat though, of course, being irregular in shape and to some extent varying in consistency, it is not the same kind of a fit that you would have if a cylindrical plug were placed in a cylindrical can. There will always be some areas of contact between the can and the meat and for the purpose of illustration I have exaggerated the difference between the can and the meat but it will be understood that the closer the contact between the can and the meat, the better the resulting product.

I claim:

1. The method of cooking which consists in enclosing a solid mass of meat in a permanently sealed heat conducting container, the walls of which are in engagement with a substantial portion of the periphery of the mass, there being a plurality of spaced heat conducting members penetrating the mass and in heat conductive contact at both ends with the wall of the container, then applying heat to the outer periphery of the container whereby the mass is heated by direct contact with the container walls and the interior of the mass is heated by conduction from the container walls along the conducting members.

2. The method of cooking solid masses of meat contained in hermetically sealed containers, which consists in applying heat to the outside of the container and heating the meat by contact with and by radiation from the container walls and heating the inner portions of the meat mass by conduction from one wall of the container to the other independent of the conductive characteristics of the meat mass itself.

3. The method of preserving meat which consists in parboiling meat at temperatures in the neighborhood of 212 degrees F. until an initial shrinkage of from fifteen to twenty percent has occurred, then placing a solid chunk of the meat in a heat conducting vacuum sealed container, the chunk of meat substantially fitting the container, the meat being slotted from end to end to receive a heat conducting skewer permanently attached in heat conducting relationship at one end to the container and engaging the other end, then heating the container until the mass of meat has reached a temperature of 221 degrees F.

4. The method of preserving meat which consists in sealing a solid mass of meat in a vacuum sealed heat conducting container, the meat being slotted from side to side of the mass, there being a heat conducting member in permanent heat conducting relationship with one side of the container and extending through the mass of meat, to the other side of the container.

5. The method of preserving meat which consists in first parboiling a mass of meat to extract excess moisture, then cutting a flat slot through the mass of meat from end to end, then depositing the meat in a heat conducting container, which is substantially filled thereby, then sealing the container under vacuum, then heating the container to sterilize the meat while conducting heat from the walls longitudinally along the slot in the meat independent of the heat conducting characteristics of the meat itself.

6. The method of preserving meat which consists in sealing a solid mass of meat in a vacuum sealed heat conducting container, slotting the meat from side to side of the mass, and inserting a heat conducting member in permanent heat conducting relationship with one side of the container through the mass of meat, and thereby spreading the opposed walls of the slot in the mass apart to provide a passage through the meat for juice penetration.

7. The method of preserving meat which consists in permanently enclosing it in a vacuum sealed heat conducting zone, placing the meat mass in contact with the heat conducting boundaries of the zone, slotting the meat as from end to end thereof, and stretching the opposed walls of the slot apart to provide a permanent juice passage from one side of the meat to the other, whereby heat may be conducted independently of the conductivity of the meat from the hot wall of the zone to the interior of the meat mass.

References Cited in the file of this patent

UNITED STATES PATENTS

| | | |
|---|---|---|
| 267,535 | Hurd | Nov. 14, 1882 |
| 1,015,892 | Jefferson | Jan. 30, 1912 |
| 2,374,302 | Orkfritz | Apr. 24, 1945 |
| 2,488,164 | Bowman | Nov. 15, 1949 |
| 2,503,318 | Bienert | Apr. 11, 1950 |
| 2,535,405 | Fulton | Dec. 26, 1950 |
| 2,627,111 | McDevitt | Feb. 3, 1953 |

FOREIGN PATENTS

| | | |
|---|---|---|
| 1,698 | Great Britain | Apr. 8, 1882 |
| 375,997 | Great Britain | July 7, 1932 |